United States Patent
Arisoylu et al.

(10) Patent No.: US 9,762,483 B2
(45) Date of Patent: Sep. 12, 2017

(54) BNG / SUBSCRIBER MANAGEMENT INTEGRATED, FIB BASED, PER SUBSCRIBER, OPT-IN OPT-OUT, MULTI APPLICATION SERVICE CHAINING SOLUTION VIA SUBSCRIBER SERVICE CHAINING NEXTHOP AND META IP LOOKUP

(71) Applicant: Telefonaktiebolaget L M Ericsson (publ), Stockholm (SE)

(72) Inventors: Mustafa Arisoylu, San Jose, CA (US); Ramanathan Lakshmikanthan, Santa Clara, CA (US); Albert Jining Tian, Cupertino, CA (US); Himanshu Asnani, San Jose, CA (US); Prashant Anand, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 174 days.

(21) Appl. No.: 14/640,452

(22) Filed: Mar. 6, 2015

(65) Prior Publication Data
US 2016/0261497 A1    Sep. 8, 2016

(51) Int. Cl.
*H04L 12/741* (2013.01)
*H04L 12/28* (2006.01)
(Continued)

(52) U.S. Cl.
CPC .............. *H04L 45/74* (2013.01); *H04L 12/28* (2013.01); *H04L 45/54* (2013.01); *H04L 45/64* (2013.01); *H04L 45/44* (2013.01)

(58) Field of Classification Search
None
See application file for complete search history.

(56) References Cited

U.S. PATENT DOCUMENTS

| | | | |
|---|---|---|---|
| 6,721,800 B1 | 4/2004 | Basso et al. | |
| 7,106,740 B1 | 9/2006 | Leelanivas et al. | |
| (Continued) | | | |

FOREIGN PATENT DOCUMENTS

WO    WO-2007/110951    10/2007

OTHER PUBLICATIONS

Audet, F., et al., "Network Address Translation (NAT) Behavioral Requirements for Unicast UDP", *Network Working Group*, Request for Comments: 4787, The IETF Trust, (Jan. 2007), 29 pages.

*Primary Examiner* — Hassan Kizou
*Assistant Examiner* — Hashim Bhatti
(74) *Attorney, Agent, or Firm* — Patent Portfolio Builders, PLLC

(57) ABSTRACT

Exemplary methods for performing service chaining include generating a plurality of service chaining (SC) next hops (NHs) by, for each SC NH hop, generating a plurality of SC maps, each SC map identifying a chain of one or more service modules, wherein each service module is to apply a corresponding service on a packet. The methods further include generating a plurality of hosted NHs, each hosted NH including forwarding information that causes the packet to be forwarded to a corresponding service module. The methods further include in response to receiving a first packet, identifying a SC NH of the plurality of SC NHs based on an Internet Protocol (IP) address of the first packet, and forwarding the first packet to a service module based on the identified SC NH.

12 Claims, 7 Drawing Sheets

(51) Int. Cl.
  *H04L 12/715* (2013.01)
  *H04L 12/721* (2013.01)

(56) References Cited

U.S. PATENT DOCUMENTS

| | | |
|---|---|---|
| 7,447,166 B1 | 11/2008 | Kaluve et al. |
| 7,835,275 B1 | 11/2010 | Swan et al. |
| 8,532,127 B2 | 9/2013 | Kompella |
| 8,660,118 B2 | 2/2014 | Grosser et al. |
| 2002/0035639 A1 | 3/2002 | Xu |
| 2005/0078668 A1* | 4/2005 | Wittenberg ......... H04L 12/2856 370/389 |
| 2005/0289244 A1* | 12/2005 | Sahu ................... H04L 67/2819 709/249 |
| 2006/0265508 A1 | 11/2006 | Angel et al. |
| 2006/0276209 A1 | 12/2006 | Neves et al. |
| 2007/0053374 A1 | 3/2007 | Levi |
| 2009/0003375 A1* | 1/2009 | Havemann ............. H04L 45/00 370/463 |
| 2009/0307092 A1 | 12/2009 | Gugliuzza et al. |
| 2011/0078326 A1 | 3/2011 | Horibuchi |
| 2011/0110373 A1 | 5/2011 | Ghosh et al. |
| 2011/0145763 A1 | 6/2011 | Dong et al. |
| 2011/0179277 A1 | 7/2011 | Haddad et al. |
| 2015/0092551 A1* | 4/2015 | Moisand ............. H04L 12/4633 370/235 |
| 2016/0212048 A1* | 7/2016 | Kaempfer ............... H04L 45/54 |

\* cited by examiner

400

```
Generate a plurality of service chaining (SC) next hops (NHs) by, for each SC NH hop:
generating a plurality of SC maps, each SC map identifying a sequence of one or more
                    services that are to be applied on a packet, and
generating a plurality of hosted NHs, each hosted NH including forwarding information
that causes the packet to be forwarded to a corresponding service module, wherein each
           service module is configured to apply a corresponding service on the packet
                                        405
```

↓

```
In response to receiving a first packet, identify a SC NH of the plurality of SC NHs based
                    on an Internet Protocol (IP) address of the first packet
                                        410
```

↓

```
Apply one or more services on the first packet based on the identified SC NH
                                        415
```

FIG. 4

BNG / SUBSCRIBER MANAGEMENT INTEGRATED, FIB BASED, PER SUBSCRIBER, OPT-IN OPT-OUT, MULTI APPLICATION SERVICE CHAINING SOLUTION VIA SUBSCRIBER SERVICE CHAINING NEXTHOP AND META IP LOOKUP

FIELD

Embodiments of the invention relate to the field of packet networks, and more specifically, to the service chaining in the field of networking.

BACKGROUND

A provider edge network may apply advanced subscription based services to packets through service path based chaining of the different advanced subscription based services. By way of example, an upstream (also commonly referred to as an uplink) packet from a subscriber may be forwarded to a subscriber terminating entity. The subscriber terminating entity may access per-subscriber service characterization information in order to determine an upstream service path that is appropriate for the upstream packet. The upstream service path may identify both services that are to be applied to the upstream packet, and an order in which the different services are to be applied to the upstream packet. The subscriber terminating entity may add an upstream service path identifier (ID) to the upstream packet, and then forward the upstream packet to the first service engine along the upstream service path. The first service engine may perform its associated service on the upstream packet. The first service engine may then use the upstream service path ID to identify the next service engine along the path where the upstream packet is to be forwarded. Similarly, other service engines along the upstream service path may forward the upstream packet according to the upstream service path ID.

However, one challenge with service path based chaining approaches is that determination of downstream service paths for downstream packets (e.g., transmitted from a provider end station toward a subscriber end station) tends to be more difficult to implement than determination of upstream service paths. When a downstream packet is received at a line card, typically the line card is not provisioned with per-subscriber service policy information, since this would generally tend to be scale-wise prohibitive. In one possible approach the line card may simply forward the packet to the subscriber terminating entity to allow the subscriber terminating entity to determine the appropriate downstream service path. One drawback is that this may result in the subscriber terminating entity needing to process the downstream packet twice, once at the beginning of the downstream service path (e.g., in order to determine the downstream service path), and again at the end of the downstream service path (e.g., to forward the downstream packets to an external element through the line cards). When the amount of packet traffic is high, this may significantly limit the performance of the subscriber terminating entity.

In some prior approaches, the line card may use an Access Control List (ACL) based approach to determine the downstream service path. However, such ACL based approaches tend to have certain drawbacks. For example, with ACL based service chaining, subscriber application steering knowledge generally has to be known to the forwarding controller. For example, in ACL based approaches, the downstream service path is generally determined based primarily on the source port of the downstream packet identifying a particular type of service or application. For example, a source port of 80/8080 may identify Hypertext Transfer Protocol (HTTP), a source port of 443 may identify Hypertext Transfer Protocol Secure (HTTPS), a source port of 20 may identify FTP, a source port of 25 may identify SMTP (e.g., email), and a source port of 3724 may identify gaming applications. The downstream service path determination is highly subscriber application dependent, which tends to limit the applicability of the ACL based approaches. Also such ACL based service chaining approaches are generally limited to service paths involving no more than generally about two different services. Furthermore, the ACL rules are generally statically programmed or configured on the line cards, rather than being dynamically adapted or learned during runtime. This tends to make changing or adding rules more difficult. Additionally, provisioning all of the line cards with the ACL rules may be scale-wise prohibitive when the number of subscribers is high.

In yet another conventional approach, the line card determines the service path and inserts metadata in the packet header in order to specify the order in which the services are to be applied on the packet. The drawback with such an approach, however, is that the metadata must be carried in the packet header, which may not be feasible with various applications. Further, such an approach requires the line card to perform flow learning in the downstream direction (thus, rendering the solution not scalable) or requires the downstream traffic to be sent to the subscriber management entity multiple times (thus, rendering the solution inefficient).

SUMMARY

Exemplary methods performed by a first network device for performing service chaining include generating a plurality of SC NHs by, for each SC NH hop, generating a plurality of SC maps, each SC map identifying a sequence of one or more services that are to be applied on a packet, and generating a plurality of hosted NHs, each hosted NH including forwarding information that causes the packet to be forwarded to a corresponding service module, wherein each service module is configured to apply a corresponding service on the packet. The methods further include in response to receiving a first packet, identifying a SC NH of the plurality of SC NHs based on an Internet Protocol (IP) address of the first packet. The methods further include applying one or more services on the first packet based on the identified SC NH.

According to one embodiment, identifying the SC NH of the plurality of SC NHs based on the IP address of the first packet comprises in response to determining the first packet is an upstream packet transmitted by a subscriber end station, using a source IP address of the first packet to identify the SC NH. In one such embodiment, forwarding the first packet to the service module based on the identified SC NH comprises in response to determining the first packet is the upstream packet transmitted by the subscriber end station, identifying an upstream SC map of the SC NH, determining an interface from which the first packet was received, identifying a hosted NH of a plurality of hosted NHs of the SC NH based on the determined interface and the upstream SC map, and using forwarding information included in the hosted NH to forward the first packet to the service module, causing the service module to apply a corresponding service on the first packet.

According to one embodiment, the methods further include determining a subscriber application to which the first packet belongs, and identifying the upstream SC map based on the determined subscriber application.

In one embodiment, identifying the SC NH of the plurality of SC NHs based on the IP address of the first packet comprises in response to determining the first packet is a downstream packet transmitted to a subscriber end station, using a destination IP address of the first packet to identify the SC NH. In one such embodiment, forwarding the first packet to the service module based on the identified SC NH comprises in response to determining the first packet is the downstream packet transmitted to the subscriber end station, identifying a downstream SC map of the SC NH, determining an interface from which the first packet was received, identifying a hosted NH of a plurality of hosted NHs of the SC NH based on the determined interface and the downstream SC map, and using forwarding information included in the hosted NH to forward the first packet to the service module, causing the service module to apply a corresponding service on the first packet.

According to one embodiment, the methods further include identifying a subscriber profile associated with the first packet, identifying a first service module based on the subscriber profile, and forwarding the first packet to the first service module, causing the first service module to apply a first service on the first packet.

BRIEF DESCRIPTION OF THE DRAWINGS

The invention may best be understood by referring to the following description and accompanying drawings that are used to illustrate embodiments of the invention. In the drawings:

FIG. 4 is a flow diagram illustrating a method for performing service chaining according to one embodiment.

DESCRIPTION OF EMBODIMENTS

Figure 1:
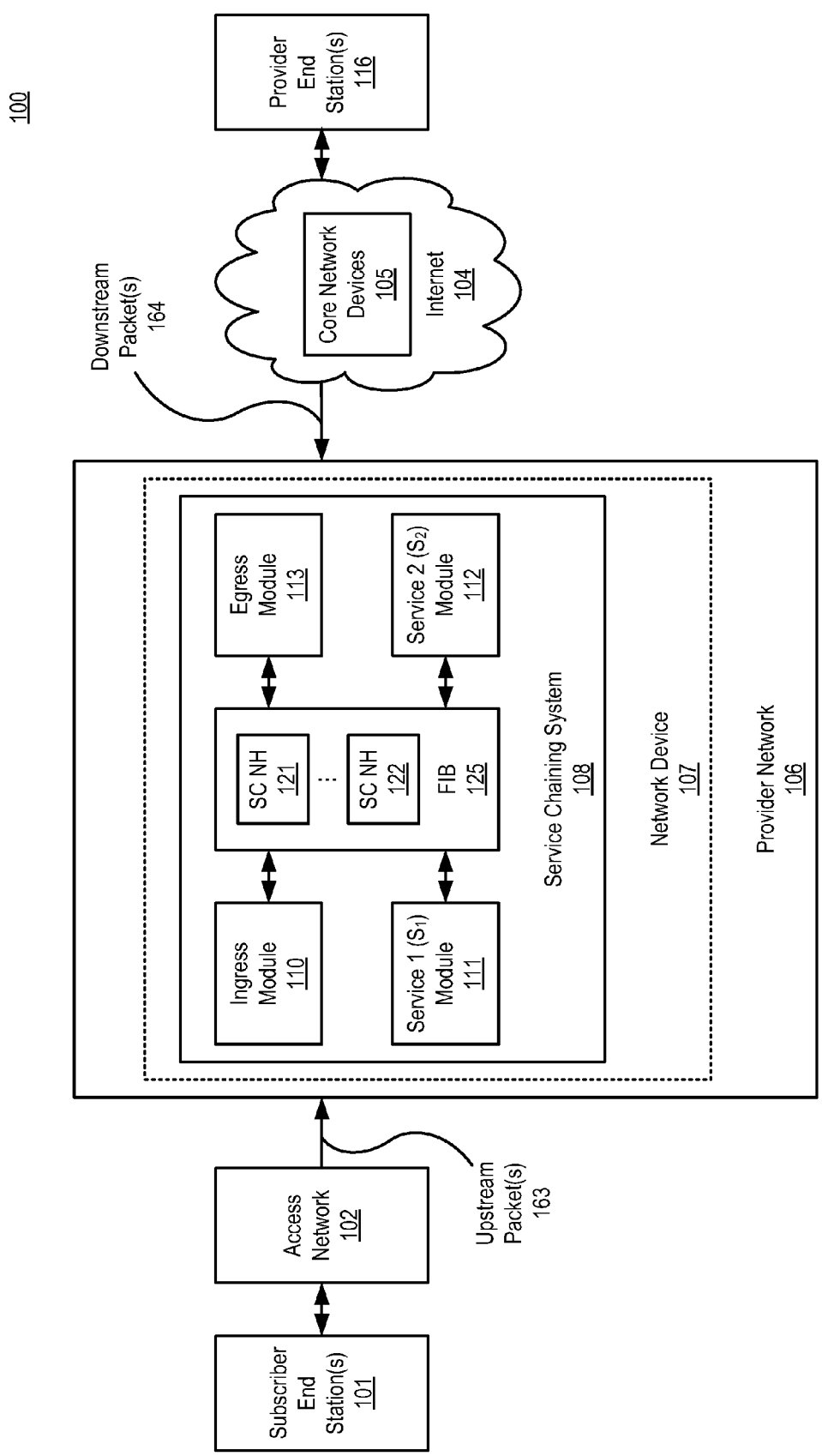
FIG. 1 is a block diagram illustrating a network for performing service chaining according to one embodiment.

The following description describes methods and apparatus for performing service chaining. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram illustrating a network according to one embodiment. In the illustrated example, network 100 includes, but is not limited to, one or more subscriber end stations 101. Examples of suitable subscriber end stations include, but are not limited to, servers, workstations, laptops, netbooks, palm tops, mobile phones, smartphones, multimedia phones, tablets, phablets, Voice Over Internet Protocol (VOIP) phones, user equipment, terminals, portable media players, GPS units, gaming systems, set-top boxes, and combinations thereof. Subscriber end stations 101 access content/services provided over the Internet and/or content/services provided on virtual private networks (VPNs) overlaid on (e.g., tunneled through) the Internet. The content and/or services are typically provided by one or more provider end stations 116 (e.g., server end stations) belonging to a service or content provider. Examples of such content and/or services include, but are not limited to, public webpages (e.g., free content, store fronts, search services), private webpages (e.g., username/password accessed webpages providing email services), and/or corporate networks over VPNs, etc.

As illustrated, subscriber end stations 101 are communicatively coupled (e.g., through customer premise equipment) to access networks 102 (wired and/or wirelessly). Access networks 102 can be communicatively coupled to provider edge network devices (e.g., network device 107) of provider edge network 106. The provider edge network devices may be communicatively coupled through Internet 104 (e.g., through one or more core network devices 105) to one or more provider end stations 116 (e.g., server end stations). In some cases, the provider edge network devices of provider edge network 106 may host on the order of thousands to millions of wire line type and/or wireless subscriber end stations, although the scope of the invention is not limited to any known number.

Subscriber end stations 101 may transmit upstream packets 163 toward provider end stations 116. Provider end stations 116 may transmit downstream packets 164 toward subscriber end stations 101. Upstream packets 163 and/or downstream packets 164 may traverse provider edge network 106 and/or network device 107.

According to one embodiment, network 100 includes service chaining system (SC system) 108 for performing services on packets the traverse provider network 106. SC system 108 includes ingress module 110 for exchanging packets with subscriber end stations 101 and egress module 113 for exchanging packets with provider end stations 116. Ingress module 110 and egress module 113 can be implemented in software, firmware, hardware, or any combination thereof.

SC system 108 includes a set of service modules adapted or configured to perform services on upstream packets 163 and/or downstream packets 164. Each service module of the set of service modules can be implemented in software, firmware, hardware, or any combination thereof. In the illustrated example, the set of service modules includes, but is not limited to, service 1 ($S_1$) module 111 and service 2 ($S_2$) module 112. In one embodiment, the service modules may provide advanced subscription based services or operations. Examples of suitable services include, but are not limited to, Deep Packet Inspection (DPI) services, Transparent Internet Caching (TIC) services, Content Delivery Network (CDN) services, Network Address Translation (NAT) services. Other examples of suitable services include, but are not limited to, parental control services, Internet Protocol Security (IPSec) services, firewall services, WAN (wireless area network) optimization services, and profiling and flow tracking services. According to one embodiment, application of these services to subscriber traffic may be determined at least in part based on subscription policies (e.g., payment plans) associated with the subscribers or subscriber end stations. For example, one subscriber may desire the services of service 1 module 111 and service 2 module 112, whereas another subscriber may desire to pay for the services of service 2 module 112. In some aspects, these subscription policies may be included in the subscriber records or attributes associated with the subscribers or subscriber end stations.

According to one embodiment, SC system 108 includes FIB 125 adapted or configured to perform service chaining on upstream packets 163 and/or downstream packets 164. As used herein, "service chaining" refers to the application of services on the packets in a predetermined order/sequence. In one embodiment, FIB 125 is to perform service chaining by using a set of one or more service chaining (SC) next hops (NHs). As illustrated, the set of one or more SC NHs includes, but is not limited to, SC NHs 121-122. Each SC NH includes at least one SC map (not shown) representing/identifying one or more services to be applied/performed on the packets, as well as an order in which the one or more services are to be performed on the packets. For example, a SC map identifies the service modules the packets are to be forwarded to, as well as an order of the service modules in which the packets are to be forwarded to. In one embodiment, each subscriber is associated with a SC NH. Thus, for example, when a packet belonging to a subscriber is received, FIB 125 identifies a SC NH that is associated with the subscriber (e.g., by using an IP address of the received packet), and uses the identified SC NH (e.g., the SC map(s) stored therein) to perform service chaining on the packet. Service chaining is described in greater details below.

Typically, a network device, such as network device 107, includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPSec), Intrusion Detection System (IDS), Peer-to-Peer (P2P)), Voice over IP (VoIP) Session Border Controller, Mobile Wireless Gateways (e.g., Gateway General Packet Radio Service (GPRS) Support Node (GGSN), Evolved Packet System (EPS) Gateway)). By way of example, a service card may be used to terminate IPSec tunnels and execute the attendant authentication and encryption algorithms.

According to one embodiment, the various modules of SC system 108 can be implemented as part of one network device (e.g., network device 107). For example, ingress module 110 and egress module 113 can be implemented as part of one or more line cards of network device 107. By way of further example, service modules 111-112 can be implemented as part of one or more service cards of network device 107. FIB 125, in one embodiment, can be also be implemented as part of one or more line cards and/or service cards of network device 107.

In an alternative embodiment, the various modules of SC system 108 can be implemented as virtual machines that are executed on one or more network devices. In such an embodiment, the various virtualized modules of SC system 108 that are distributed among different network devices communicate with other using tunneling mechanisms (e.g., Virtual Extensible LAN (VxLAN)). Virtual machines are described in further details below. Embodiments of the present invention shall now be described in greater details through the description of various other figures below.

Figure 2:
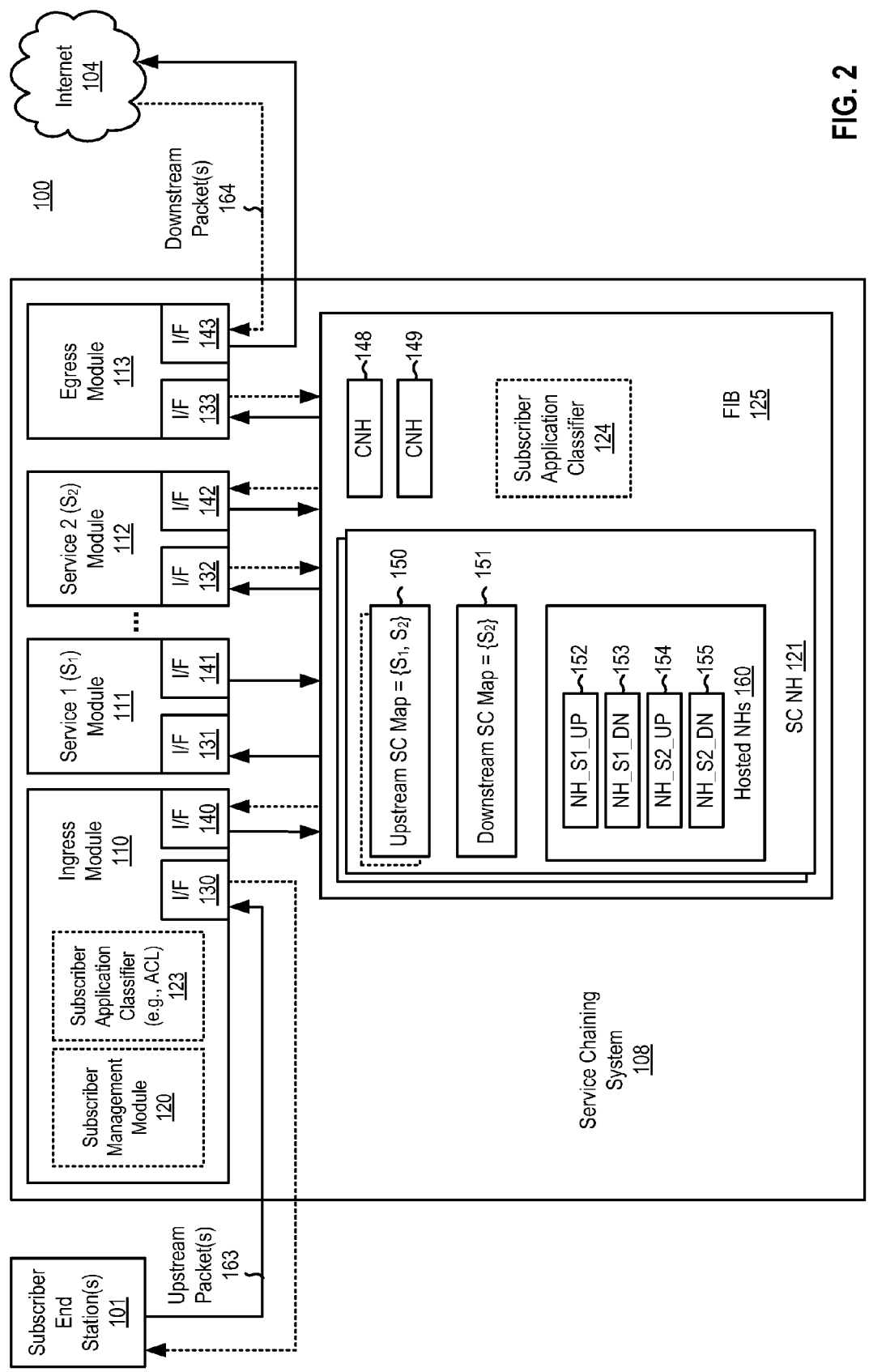
FIG. 2 is a block diagram illustrating a network for performing service chaining according to one embodiment.

FIG. 2 is a block diagram illustrating a network according to one embodiment. Network 100 illustrated in FIG. 2 is similar to network 100 in FIG. 1. Certain details of network 100, however, have been omitted in FIG. 2 in order to avoid obscuring the invention. Further, certain details of network 100 have been added in FIG. 2 in order to better illustrate the invention.

Referring now to FIG. 2. Ingress module 110 includes, but is not limited to, interfaces 130 and 140 (e.g., IP interfaces). Interface 130 is used for sending packets toward, and receiving packets from, the subscriber end stations (e.g., subscriber end station 101). Thus, interface 130 is herein referred to as the "subscriber side" or "subscriber facing" interface. Interface 140 is used for sending packets toward, and receiving packets from, Internet 104 (e.g., destined for or originating from provider end stations such as provider end station 116). Thus, interface 140 is herein referred to as the "Internet side" or "Internet facing" interface.

Egress module 113 includes, but is not limited to, interfaces 133 and 143 (e.g., IP interfaces). Interface 133 is used for sending packets toward, and receiving packets from, the subscriber end stations (e.g., subscriber end station 101). Thus, interface 133 is herein referred to as the "subscriber side" or "subscriber facing" interface. Interface 143 is used for sending packets toward, and receiving packets from, Internet 104 (e.g., destined for or originating from provider end stations such as provider end station 116). Thus, interface 143 is herein referred to as the "Internet side" or "Internet facing" interface.

Service modules 111-112 include, but are not limited to, interfaces 131-132, respectively, and interfaces 141-142, respectively. Interfaces 131-132 and 141-142 can be, for example, IP interfaces. Interfaces 131-132 are used for sending packets toward, and receiving packets from, the subscriber end stations (e.g., subscriber end station 101). Thus, interfaces 131-132 are herein referred to as the "subscriber side" or "subscriber facing" interface. Interfaces 141-142 are used for sending packets toward, and receiving packets from, Internet 104 (e.g., destined for or originating from provider end stations such as provider end station 116). Thus, interfaces 141-142 are herein referred to as the "Internet side" or "Internet facing" interface.

Accordingly, it should be noted that the inputs into interfaces 130-133 and the outputs of interfaces 140-143 represent the upstream path, while the inputs to interfaces 140-143 and the outputs of interfaces 130-133 represent the downstream path. In other words, upstream packets flow into interfaces 130-133 and out of interfaces 140-13, while downstream packets flow into interfaces 140-143 and out of interfaces 130-133.

According to one embodiment, FIB 125 is adapted to perform service chaining on upstream and downstream packets at a subscriber granularity. In other words, FIB 125 can be configured to apply, for each subscriber, an upstream SC map to all upstream packets that belong to the respective subscriber, and a downstream SC map to all downstream packets belong to the respective subscriber.

In another embodiment, FIB 125 can be adapted to perform service chaining at a subscriber application granularity per subscriber. In other words, FIB 125 can be configured to apply, for each subscriber application that belongs to a subscriber, an upstream SC map to all upstream packets of the respective subscriber application that belong to the respective subscriber. In such an embodiment, SC system 108 is to include optional subscriber application classifier 123 or optional subscriber application classifier 124.

Subscriber application classifier 123 can be implemented as an Access Control List (ACL). Subscriber application classifier 123, for example, can classify upstream packets 163 (i.e., identify the subscriber applications to which upstream packets 163 belong) based on the packet headers (e.g., the transport protocol source port, transport protocol destination port, etc.). In one such embodiment, prior to sending upstream packets 163 to FIB 125, subscriber application classifier 123 is to insert metadata in upstream packets 163 indicating the subscriber application to which the packets belong to. For example, the metadata may indicate that a packet belongs to a HTTP session, a video session, etc. In one embodiment, subscriber application classifier 123 inserts metadata indicating the packet belongs to a "default" subscriber application in response to determining the packet does not belong to one of the predetermined subscriber applications.

Alternatively, SC system 108 can performing subscriber application classification by using subscriber application classifier 124. It should be noted that in this embodiment, the classification is performed by FIB 125. In other words, upstream packets 163 received by FIB 125 do not include metadata indicating the subscriber application to which the packets belong. Subscriber application classifier 124, for example, can classify upstream packets 163 based on the packet headers (e.g., the transport protocol source port, transport protocol destination port, etc.).

According to one embodiment, FIB 125 includes a plurality of SC NHs, each of which can be implemented as one or more data structures stored in one or more storage devices accessible by SC system 108. Each SC NH, according to one embodiment, includes a plurality of SC maps, thus enabling FIB 125 to perform service chaining at a subscriber granularity. In the illustrated example, SC NH 121 includes upstream SC map 150 and downstream SC map 151. Upstream SC map 150 indicates, in this example, that service 1 followed by service 2 are to be applied on packets that belong to the subscriber associated with SC NH 121. Downstream SC map 151 indicates, in this example, that only service 2 is to be applied on packets that belong to the subscriber associated with SC NH 121.

The SC maps can be implemented using various mechanisms. For example, each SC map can include a service identifier (ID) that identifies a service, wherein the presence of an ID indicates that the service is to be applied, and the order of the IDs indicate the order in which the identified services are to be applied on the packets. Alternatively, each SC map can be implemented as a bit map, wherein each bit in the SC map corresponds to a predetermined service. In such an embodiment, a bit having a first predetermined value (e.g., 1) may indicate that the corresponding service is to be applied, while a bit having a second predetermined value (e.g., 0) may indicate that the corresponding service is not to be applied. Other conventions, however, can be used to encode the bit map. In this embodiment, the order in which the services are to be applied is predetermined, and the setting/value of the bit determines whether the respective service is to be applied.

In an embodiment where FIB 125 is adapted to perform service chaining at a subscriber application granularity, the SC NHs are to include upstream SC maps at the subscriber application granularity. For example, upstream SC map 150, instead of being a single SC map, represents a collection of upstream SC maps, one for each of the predetermined subscriber application. By way of example, upstream SC map 150 may include an upstream SC map for an HTTP application, an upstream SC map for a video application, etc. Upstream SC map 150 may also include a "default" upstream SC map that is to be used when the upstream packet does not belong to one of the predetermined subscriber applications.

According to one embodiment, each SC NH includes a plurality of hosted NHs, wherein each hosted NH includes forwarding information for causing the packet to be forwarded to a service module. Each of the hosted NHs can be implemented as one or more data structures stored in one or more storage devices accessible by SC system 108. In the illustrated example, SC NH 121 includes hosted NHs 160, comprising of hosted NHs 152-155. For example, hosted NH_S1_UP 152 may include forwarding information for causing upstream packets to be forwarded to service 1 (e.g., via interface 131), hosted NH_S1_DN 153 may include forwarding information for causing downstream packets to be forwarded to service 1 (e.g., via interface 141), hosted NH_S2_UP 154 may include forwarding information for causing upstream packets to be forwarded to service 2 (e.g., via interface 132), and hosted NH_S2_DN 155 may include forwarding information for causing downstream packets to be forwarded to service 2 (e.g., via interface 142).

As described above, one or more of service modules 111-112 can be located in one or more network devices that are separate from the network device which implements FIB 125. It should be understood that in such an architecture, the corresponding hosted NHs are to include forwarding information that causes the packets to be forwarded to the remote network device which implements one or more service modules 111-112. It should be further noted that in such an architecture, the hosted NHs are also commonly referred to as "tunneled NHs" because they contain forwarding information that causes the packets to be "tunneled" from the local network device to the remote network device that implements the service module(s). For the sake of brevity, the term "hosted NH" used throughout the description shall refer to either type of NH, depending the implemented architecture.

In one embodiment, FIB 125 may include one or more connected NHs (CNHs), each of which can be implemented as one or more data structures stored in one or more storage devices accessible by SC system 108. In the illustrated example, FIB 125 includes, but is not limited to, CNHs 148-149. Each CNH may include forwarding information for causing the packets to be forwarded toward its destination. For example, CNH 148 may include forwarding information for causing upstream packets to be forwarded to egress module 113 (e.g., via interface 133), which in turn causes the upstream packets to be forwarded to Internet 104 (e.g., via interface 143). CNH 149 may include forwarding information for causing downstream packets to be forwarded to ingress module 110 (e.g., via interface 140), which in turn causes the downstream packets to be forwarded to the subscriber end stations (e.g., via interface 130). It should be noted that CNHs 148-149 can represent any type of connected NH. For example, CNHs 148-149 can be implemented as Equal Cost Multipath (ECMP) NHs, Fast Reroute (FRR) NHs, etc.

As described above, ingress module 110 and/or egress module 113 can be located in one or more network devices that are separate from the network device which implements FIB 125. It should be understood that in such an architecture, the corresponding connected NHs are to include forwarding information that causes the packets to be forwarded to the remote network device which implements ingress module 110 and/or egress module 113. It should be further noted that in such an architecture, the connected NHs are also commonly referred to as "tunneled NHs" because they contain forwarding information that causes the packets to be "tunneled" from the local network device to the remote network device that implements ingress module 110 and/or egress module 113. For the sake of brevity, the term "connected NH" used throughout the description shall refer to either type of NH, depending the implemented architecture.

Techniques for performing service chaining on upstream packets shall now be described by way of example. Ingress module 110 receives upstream packet 163 via its subscriber facing interface 130. In an embodiment where service chaining is performed at a subscriber application granularity, service chaining system 108 may use subscriber application classifier 123 to identify the subscriber application to which upstream packet 163 belongs. Subscriber application classifier 123 is to insert the identified subscriber application into upstream packet 163 as metadata prior to sending upstream packet 163 to the next module.

In one embodiment, ingress module 110 may include optional subscriber management module 120 (e.g., a Broadband Network Gateway (BNG) module, an Evolved Packet Gateway (EPG) module, a Gateway GPRS Support Node-Mobile Packet Gateway (GGSN-MPG) module, etc.). Subscriber management module 120 is to access a subscriber profile associated with the subscriber which initiated the transmission of upstream packet 163. For example, subscriber management module 120 can identify the subscriber profile by using the packet header of upstream packet 163 (e.g., the source IP address). In one embodiment, the subscriber profile includes an upstream SC map identifying at least the first service that is to be performed on upstream packet 163. In an embodiment where the service chaining is to be performed at the subscriber application granularity, the subscriber profile is to include the upstream SC maps at the subscriber application granularity (e.g., the subscriber profile may include an upstream SC map for each of the predetermined subscriber applications). In such an embodiment, subscriber management module 120 is to identify and select the upstream SC map based on the subscriber application to which upstream packet 163 belongs. In one embodiment, subscriber management module 120 is to forward upstream packet 163 directly to the first service module as indicated by the subscriber profile.

In an alternative embodiment where subscriber management module 120 is not implemented, ingress module 110 is to send upstream packet 163 (via Internet facing interface 140) to FIB 125 in order to determine the first service that is to be applied on upstream packet 163.

In response to receiving upstream packet 163, FIB 125 determines whether the received packet is an upstream packet or a downstream packet. In one embodiment, FIB 125 determines whether a received packet is upstream or downstream based on the interface from which the packet was received. For example, FIB 125 determines that a received packet is an upstream packet if it is received from an Internet facing interface (e.g., one of interfaces 140-142). By way of further illustration, FIB 125 determines that a received packet is a downstream packet if it is received from a subscriber facing interface (e.g., one of interfaces 130-132). In this example, FIB 125 determines that the received packet is an upstream packet because it was received from Internet facing interface 140.

According to one embodiment, in order to determine how to perform service chaining on a received packet, FIB 125 identifies a SC NH that is associated with the subscriber that transmitted the packet or the subscriber for which the packet is intended. In one such embodiment, in response to determining the received packet is an upstream packet, FIB 125 uses a meta IP address of the packet to reference/identify the SC NH. It should be noted that the meta IP address can be any IP address which is embedded/encapsulated at a predetermined location in the received packet. In one embodiment, the meta IP address is the source IP address of the packet. Alternatively, in response to determining the received packet is a downstream packet, FIB 125 uses a destination IP address of the packet to reference/identify the SC NH. In this example, in response to determining that the received packet is an upstream packet, FIB 125 uses its source IP address to reference/select/identify a SC NH associated with the subscriber that transmitted the packet. In this example, it is assumed that, based on the source IP address of the packet, FIB 125 identifies SC NH 121.

According to one embodiment, FIB 125 identifies a SC map in the identified SC NH to use for performing service chaining on the received packet. In one embodiment, FIB 125 identifies the SC map based on whether the received packet is an upstream or downstream packet. For example, in response to determining the received packet is an upstream packet, FIB 125 identifies and selects an upstream SC map. Alternatively, in response to determining the received packet is a downstream packet, FIB 125 identifies and selects a downstream SC map. It should be noted that if the packet is an upstream packet, and FIB 125 is adapted to perform service chaining at the subscriber application granularity, then FIB 125 is to identify the subscriber application to which the received packet belongs, by either 1) examining the metadata included in the packet, or 2) causing subscriber application subscriber 124 to classify/identify the subscriber application to which the packet belongs. FIB 125 then identifies and selects the upstream SC map (that is associated with the identified subscriber application) to be used for performing service chaining.

In this example, in response to determining the received packet is an upstream packet, FIB 125 identifies upstream SC map 150 to use for performing service chaining on upstream packet 163. It should be noted that if the service chaining is performed at the subscriber application granularity, upstream SC map 150 is specific to the subscriber application to which the received packet belongs.

According to one embodiment, FIB 125 determines the next service module (if any) to forward the received packet to based the identified SC map and further based on the interface from which the packet was received. In such an embodiment, FIB 125 determines which service module (if any) was the last service module to perform its service on the received packet based on the interface from which the packet was received. For example, on the upstream path, FIB 125 determines that 1) no service module has performed its service on the packet if the packet was received from Internet facing interface 140, 2) service 1 module 111 was the last service module to perform its service on the packet if the packet was received from Internet facing interface 141, and 3) service 2 module 112 was the last service module to perform its service on the packet if the packet was received from Internet facing interface 142. By way of further illustration, on the downstream path, FIB 125 determines that 1) no service module has performed its service on the packet if the packet was received from subscriber facing interface 133, 2) service 2 module 112 was the last service module to perform its service on the packet if the packet was received from subscriber facing interface 132, and 3) service 1 module 111 was the last service module to perform its service on the packet if the packet was received from subscriber facing interface 131.

In this example, upstream SC map 150 indicates that the first service module to perform its service on the received packet is service 1 module 111, and the second (which in this example, is also the last) service module to perform its service on the received packet is service 2 module 112. In response to determining that the packet was received from Internet facing interface 140, FIB 125 determines that no service has been performed on the received packet. Accordingly, FIB 125 determines that the next service module (which in this case, is the first service module) to forward the received packet to is service 1 module 111.

According to one embodiment, FIB 125 identifies the hosted NH to use for forwarding the received packet based on the service module that has been identified as the next service module to forward the packet to. For example, on the upstream path, FIB 125 determines that 1) hosted NH_S1_UP 152 should be used for forwarding the packet if the next service module is service 1 module 111, and 2) hosted NH_S2_UP 154 should be used for forwarding the packet if the next service module is service 2 module 112. By way of further illustration, on the downstream path, FIB 125 determines that 1) hosted NH_S1_DN 153 should be used for forwarding the packet if the next service module is service 1 module 111, and 2) hosted NH_S2_DN 155 should be used for forwarding the packet if the next service module is service 2 module 112. In this example, FIB 125 determines that the received packet is an upstream packet, and that the next service module to perform its service on the packet is service 1 module 111, and thus, uses hosted NH_S1_UP 152 to forward the packet to service 1 module 111 via subscriber facing interface 131.

Service 1 module 111, in response to receiving the packet from FIB 125, performs its service on the packet, and forwards the processed/serviced packet back to FIB 125 via its Internet facing interface 141.

In response to receiving the packet from service 1 module 111, FIB 125 determines which service module (if any) to forward the packet to by using mechanisms similar to those described above. For example, FIB 125 determines that the received packet is an upstream packet because it was received from Internet facing interface 141. In response to determining that the received packet is an upstream packet, FIB 125 uses its source IP address to reference/select/identify a SC NH associated with the subscriber that transmitted the packet. In this example, it is assumed that, based on the source IP address of the packet, FIB 125 identifies SC NH 121.

Further, in response to determining the received packet is an upstream packet, FIB 125 identifies upstream SC map 150 of SC NH 121 to use for performing service chaining on the received packet. In response to determining that the packet was received from Internet facing interface 141, FIB 125 determines that service 1 module 111 was the last service module to perform its service on the received packet. Accordingly, FIB 125 determines that the next service module to forward the packet to is service 2 module 112, and uses hosted NH_S2_UP 154 to forward the packet to service 2 module 112 via subscriber facing interface 132.

Service 2 module 112, in response to receiving the packet from FIB 125, performs its service on the packet, and forwards the processed/serviced packet back to FIB 125 via its Internet facing interface 142.

In response to receiving the packet from service 2 module 112, FIB 125 determines which service module (if any) to forward the packet to by using mechanisms similar to those described above. For example, FIB 125 determines that the received packet is an upstream packet because it was received from Internet facing interface 142. In response to determining that the received packet is an upstream packet, FIB 125 uses its source IP address to reference/select/identify a SC NH associated with the subscriber that transmitted the packet. In this example, it is assumed that, based on the source IP address of the packet, FIB 125 identifies SC NH 121.

Further, in response to determining the received packet is an upstream packet, FIB 125 identifies upstream SC map 150 of SC NH 121 to use for performing service chaining on the received packet. In response to determining that the packet was received from Internet facing interface 142, FIB 125 determines that service 2 module 112 was the last service module to perform its service on the received packet. Accordingly, FIB 125 determines that all services have been performed on the received packet.

According to one embodiment, in response to determining all services have been performed on the packet, FIB 125 identifies a CNH to use for forwarding the packet toward its final destination. For example, FIB 125 uses the destination IP address of the packet to identify CNH 148, and uses the forwarding information contained therein to forward the packet to egress module 113 via subscriber facing interface 133. Egress module 113, in response to receiving the packet from FIB 125, forwards the packet toward its final destination via Internet facing interface 143.

Techniques for performing service chaining on downstream packets shall now be described by way of example. Egress module 113 receives downstream packet 164 via its Internet facing interface 143. In response to receiving downstream packet 164, egress module 113 forwards downstream packet 164 (via its subscriber facing interface 133) to FIB 125 in order to determine the first service that is to be applied on downstream packet 164.

In response to receiving the packet from egress module 113, FIB 125 determines which service module (if any) to forward the packet to by using mechanisms similar to those described above. For example, FIB 125 determines that the received packet is a downstream packet because it was received from subscriber facing interface 133. In response to determining that the received packet is a downstream packet, FIB 125 uses its destination IP address to reference/select/identify a SC NH associated with the subscriber that the packet is intended for. In this example, it is assumed that, based on the destination IP address of the packet, FIB 125 identifies SC NH 121.

Further, in response to determining the received packet is a downstream packet, FIB 125 identifies downstream SC map 151 of SC NH 121 to use for performing service chaining on the received packet. Downstream SC map 151, in this example, indicates that only service 2 is to be performed on the downstream packet. In response to determining that the packet was received from subscriber facing interface 133, FIB 125 determines that no service has been performed on the packet (because it was received from egress module 113 rather than a service module). Accordingly, FIB 125 determines that the next service module to forward the packet to is service 2 module 112, and uses hosted NH_S2_DN 155 to forward the packet to service 2 module 112 via subscriber facing interface 142.

Service 2 module 112, in response to receiving the packet from FIB 125, performs its service on the packet, and forwards the processed/serviced packet back to FIB 125 via its Internet facing interface 132.

In response to receiving the packet from service 2 module 112, FIB 125 determines which service module (if any) to forward the packet to by using mechanisms similar to those described above. For example, FIB 125 determines that the received packet is a downstream packet because it was received from subscriber facing interface 132. In response to determining that the received packet is a downstream packet, FIB 125 uses its destination IP address to reference/select/identify a SC NH associated with the subscriber that the packet is intended for. In this example, it is assumed that, based on the destination IP address of the packet, FIB 125 identifies SC NH 121.

Further, in response to determining the received packet is a downstream packet, FIB 125 identifies downstream SC map 151 of SC NH 121 to use for performing service chaining on the received packet. In response to determining that the packet was received from subscriber facing interface 132, FIB 125 determines that service 2 module 112 was the last service module to perform its service on the received packet. Accordingly, FIB 125 determines that all services have been performed on the received packet.

According to one embodiment, in response to determining all services have been performed on the packet, FIB 125 identifies a CNH to use for forwarding the packet toward its final destination. For example, FIB 125 uses the destination IP address of the packet to identify CNH 149, and uses the forwarding information contained therein to forward the packet to ingress module 110 via Internet facing interface 140. Ingress module 110, in response to receiving the packet from FIB 125, forwards the packet toward its final destination via subscriber facing interface 130.

Throughout the description, embodiments of the present invention are described in the context of upstream traffic (i.e., traffic originating from a subscriber end station and destined for a provider end station) and downstream traffic (i.e., traffic originating from a provider end station and destined for a subscriber end station). It should be noted, however, that the present invention is not so limited. For example, techniques for performing service chaining of the present invention apply equally to traffic that originates from one subscriber and destined for another subscriber (commonly known as u-turn traffic). In such a use case, the upstream SC map is applied to the traffic as it traverses the upstream path, and instead of exiting the network device at the end of the upstream path, the traffic loops back and traverses the downstream path toward another subscriber, during which the downstream SC map is applied.

Figure 3:
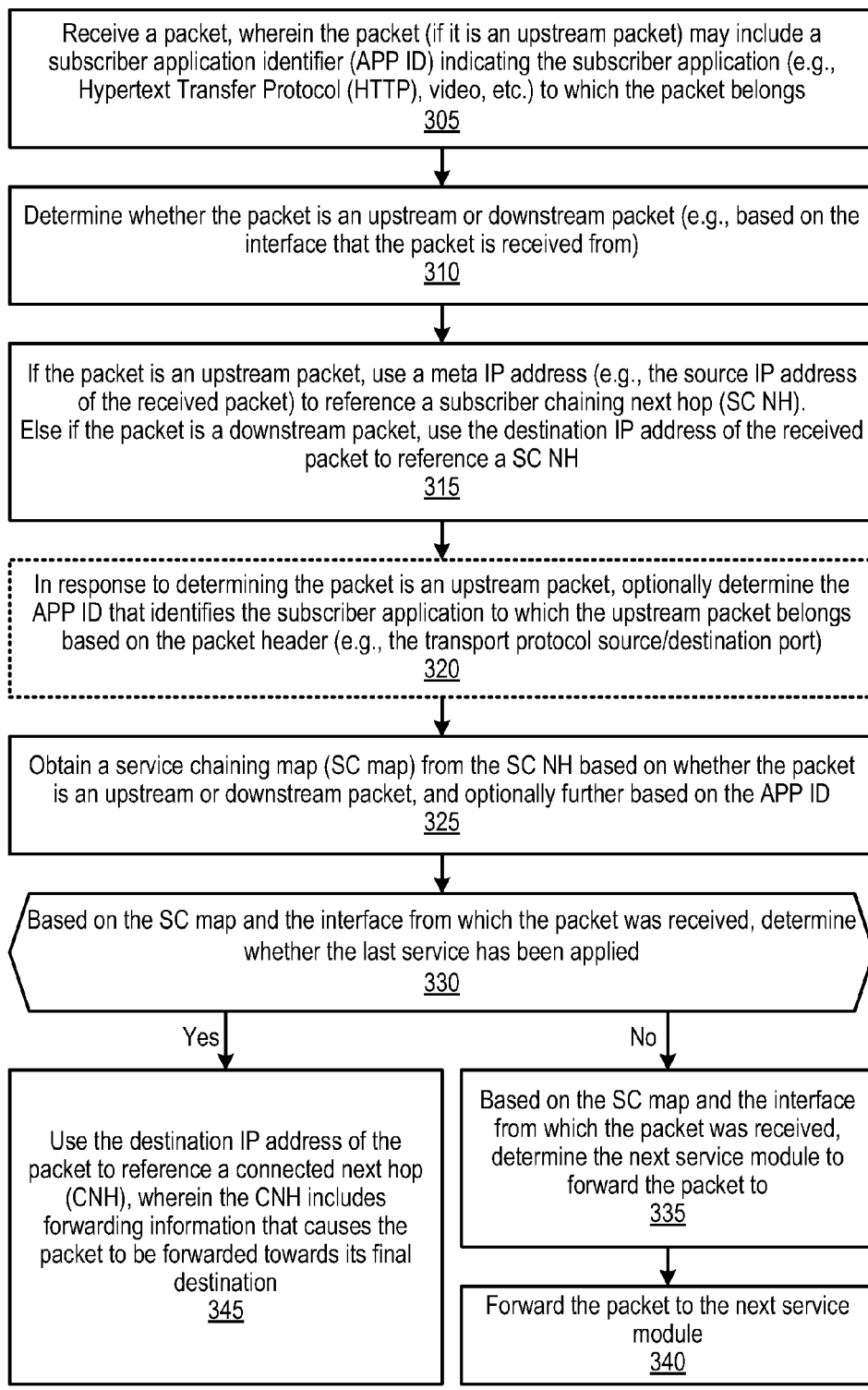
FIG. 3 is a flow diagram illustrating a method for performing service chaining according to one embodiment.

FIG. 3 is a flow diagram illustrating a method for performing service chaining according to one embodiment. For example, method 300 can be performed by SC system 108 (e.g., FIB 125 of SC system 108), which can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 3, at block 305, a FIB receives a packet, wherein the packet (if it is an upstream packet) may include a subscriber application identifier (APP ID) indicating the subscriber application (e.g., Hypertext Transfer Protocol (HTTP), video, etc.) to which the packet belongs. For example, FIB 125 receives a packet from ingress module 110, egress module 113, or service modules 111-112, wherein the packet (if the packet is an upstream packet) may include metadata (inserted by subscriber application classifier 123) indicating the subscriber application to which the upstream packet belongs.

At block 310, the FIB determines whether the packet is an upstream or downstream packet (e.g., based on the interface that the packet is received from). For example, FIB 125 determines that 1) a packet is an upstream packet if it was received from an Internet facing interface (e.g., one of Internet facing interfaces 140-142), or 2) a packet is a downstream packet if it was received from a subscriber facing interface (e.g., one of subscriber facing interfaces 131-133).

At block 315, if the packet is an upstream packet, the FIB uses a meta IP address (e.g., the source IP address of the received packet) to reference a subscriber chaining next hop (SC NH). Alternative, if the packet is a downstream packet, the FIB uses the destination IP address of the received packet to reference a SC NH. For example, in response to determining the packet is an upstream packet, FIB 125 uses the source IP address of the packet to reference/identify SC NH 121. Alternatively, in response to determining the packet is a downstream packet, FIB 125 uses the destination IP address of the packet to identify SC NH 121.

At block 320, in response to determining the packet is an upstream packet, the FIB optionally determines the application identifier (APP ID) that identifies the subscriber application to which the upstream packet belongs based on the packet header (e.g., the transport protocol source/destination port). For example, in response to determining the packet is an upstream packet, FIB 125 optionally uses subscriber application classifier 124 to determine the subscriber application that the upstream packet belongs to.

At block 325, the FIB obtains a service chaining map (SC map) from the SC NH based on whether the packet is an upstream or downstream packet, and optionally further based on the APP ID. For example, FIB 125 identifies and uses upstream SC map 150 in response to determining the packet is an upstream packet. Alternatively, FIB 125 identifies and uses downstream SC map 151 in response to determining the packet is a downstream packet. In the case where the packet is an upstream packet and service chaining is to be performed at the subscriber application granularity, upstream SC map 150 is a collection of upstream SC maps, and FIB 125 is to select from the collection the upstream SC map that corresponds to the subscriber application that the upstream packet belongs to.

At block 330, based on the SC map and the interface from which the packet was received, the FIB determines whether the last service has been applied. For example, based on upstream SC map 150, FIB 125 determines that the last service has been applied if the packet was received from interface 142. By way of further illustration, based on downstream SC map 151, FIB 125 determines that the last service has been applied if the packet was received from interface 132.

At block 335 ("No" branch of block 330), based on the SC map and the interface from which the packet was received, the FIB determines the next service module to forward the packet to. For example, based on upstream SC map 150, FIB 125 determines that the next service module is 1) service 1 module 111 if the packet was received from interface 140, or 2) service 2 module 112 if the packet was received from interface 141. By way of further illustration, based on downstream SC map 151, FIB 125 determines that the next service module is 1) service 2 module 112 if the packet was received from interface 133, or 2) service 1 module 111 if the packet was received from interface 132.

At block 340, the FIB forwards the packet to the next service module. For example, FIB 125 identifies a hosted NH (e.g., one of hosted NHs 152-155) associated with the determined next service module, and uses the forwarding information contained therein to forward the packet to the next service module.

At block 345 ("Yes" branch of block 330), the FIB uses the destination IP address of the packet to reference a connected next hop (CNH), wherein the CNH includes forwarding information that causes the packet to be forwarded towards its final destination. For example, in response to determining all services have been applied to upstream packet 163, FIB 125 uses the destination IP address of the packet to identify CNH 148, and use the forwarding information contained therein to forward the packet toward its final destination. By way of further illustration, in response to determining all services have been applied to downstream packet 164, FIB 125 uses the destination IP address of the packet to identify CNH 149, and use the forwarding information contained therein to forward the packet toward its final destination.

FIG. 4 is a flow diagram illustrating a method for performing service chaining according to one embodiment. For example, method 400 can be performed by SC system 108, which can be implemented in software, firmware, hardware, or any combination thereof. Referring now to FIG. 4, at block 405, a SC system generates a plurality of SC NHs (e.g., SC NHs 121-122) by, for each SC NH hop, generating a plurality of SC maps (e.g., SC maps 150-151), each SC map identifying a sequence of one or more services that are to be applied on a packet, and generating a plurality of hosted NHs (e.g., hosted NHs 152-155), each hosted NH including forwarding information that causes the packet to be forwarded to a corresponding service module (e.g., one of service modules 111-112), wherein each service module is configured to apply a corresponding service on the packet.

At block 410, in response to receiving a first packet (e.g., upstream packet 163 or downstream packet 164), the SC system identifies a SC NH (e.g., SC NH 121) of the plurality of SC NHs based on an Internet Protocol (IP) address of the first packet. At block 415, the SC system applies one or more services on the first packet based on the identified SC NH.

According to one embodiment, identifying the SC NH of the plurality of SC NHs based on the IP address of the first packet comprises the SC system to, in response to determining the first packet is an upstream packet transmitted by a subscriber end station, use a source IP address of the first packet to identify the SC NH. In one such embodiment, forwarding the first packet to the service module based on the identified SC NH comprises the SC system to, in response to determining the first packet is the upstream packet transmitted by the subscriber end station, identify an upstream SC map of the SC NH, determine an interface from which the first packet was received, identify a hosted NH of a plurality of hosted NHs of the SC NH based on the determined interface and the upstream SC map, and use forwarding information included in the hosted NH to forward the first packet to the service module, causing the service module to apply a corresponding service on the first packet.

According to one embodiment, method 400 further comprises the SC system to determine a subscriber application to which the first packet belongs, and identify the upstream SC map based on the determined subscriber application.

In one embodiment, identifying the SC NH of the plurality of SC NHs based on the IP address of the first packet comprises the SC system to, in response to determining the first packet is a downstream packet transmitted to a subscriber end station, use a destination IP address of the first packet to identify the SC NH. In one such embodiment, forwarding the first packet to the service module based on the identified SC NH comprises the SC system to, in response to determining the first packet is the downstream packet transmitted to the subscriber end station, identify a downstream SC map of the SC NH, determine an interface from which the first packet was received, identify a hosted NH of a plurality of hosted NHs of the SC NH based on the determined interface and the downstream SC map, and use forwarding information included in the hosted NH to forward the first packet to the service module, causing the service module to apply a corresponding service on the first packet.

According to one embodiment, method 400 further comprises the SC system to identify a subscriber profile associated with the first packet, identify a first service module based on the subscriber profile, and forward the first packet to the first service module, causing the first service module to apply a first service on the first packet.

Figure 5A:
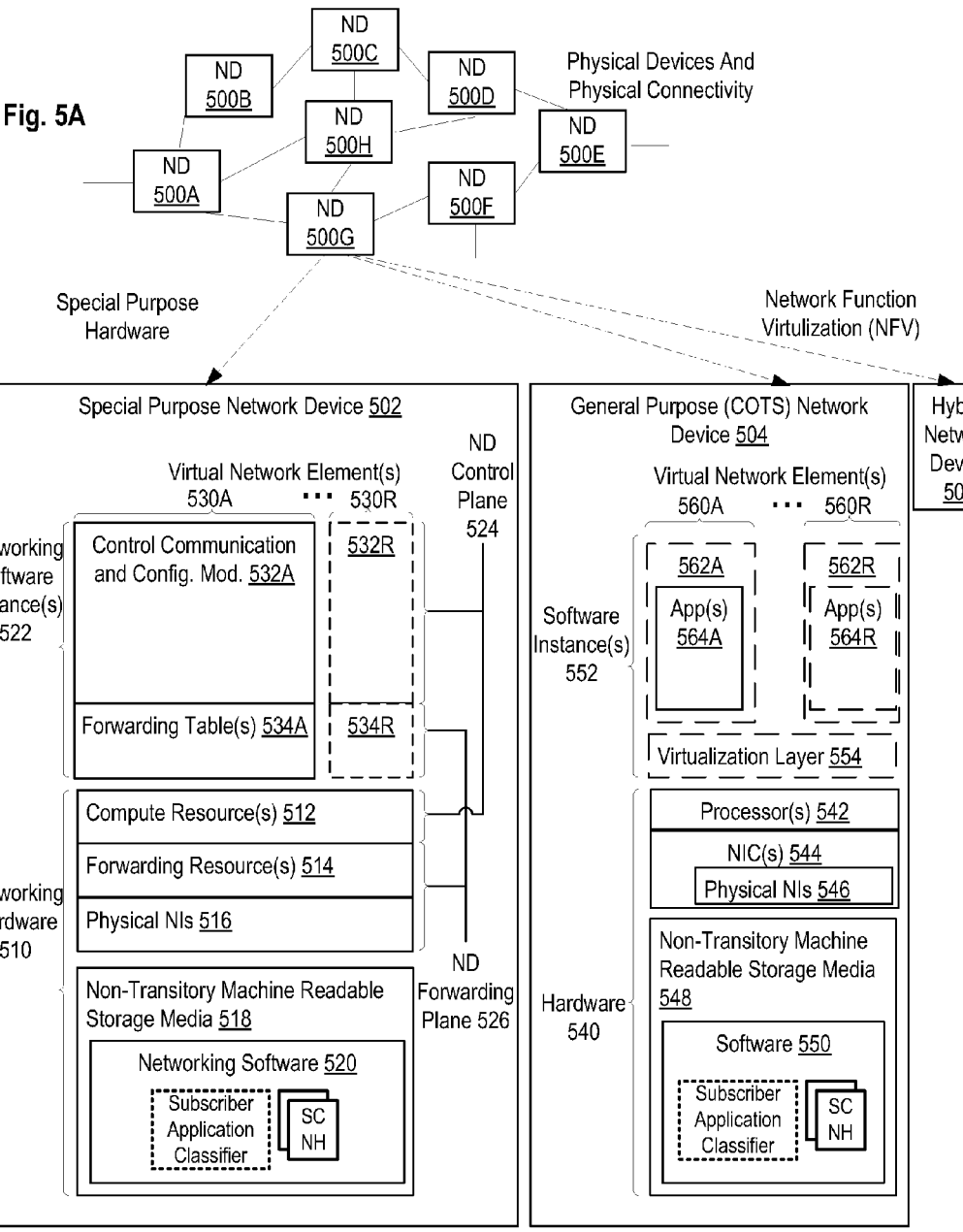
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code which when executed by networking hardware 510, causes networking hardware 510 to perform operations of one or more embodiments of the present invention as part networking software instances 522.

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
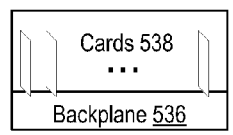
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

Software 550 can include code which when executed by processor(s) 542, cause processor(s) 542 to perform operations of one or more embodiments of the present invention as part software containers 562A-R.

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 5C:
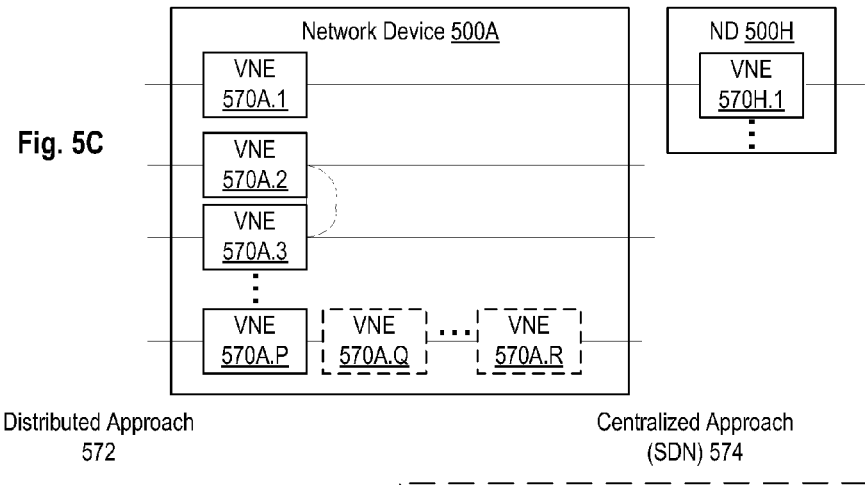
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
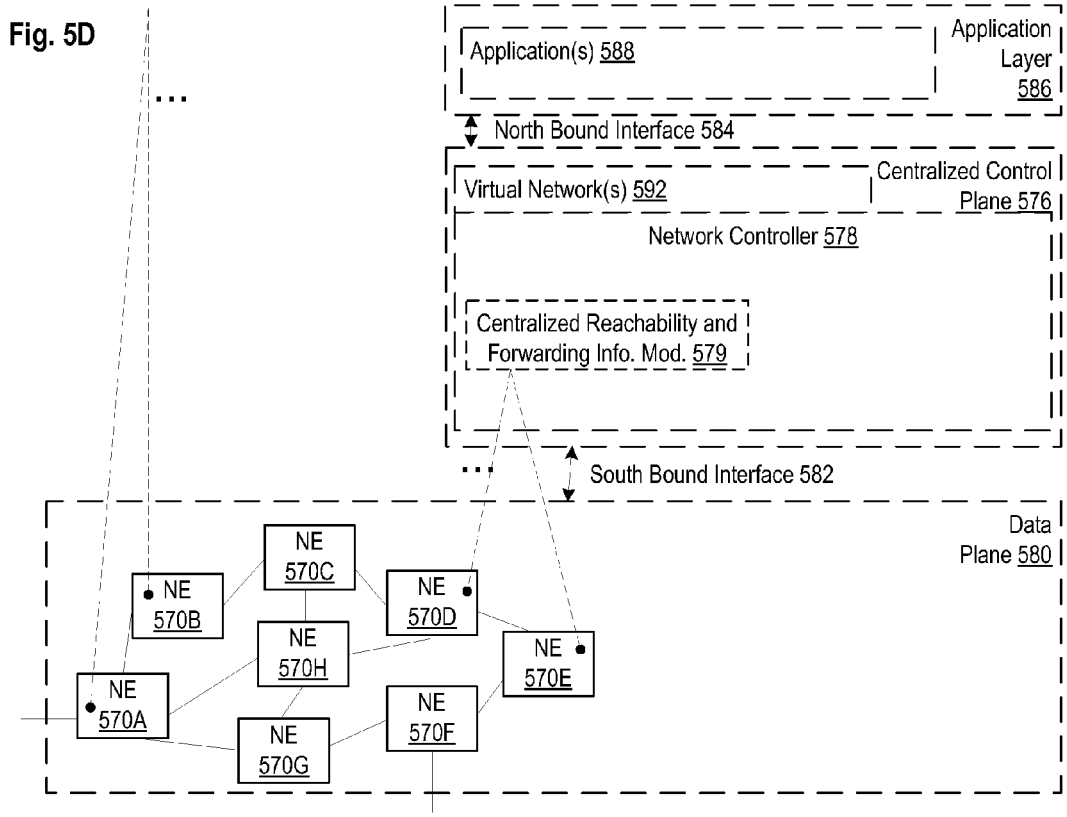
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
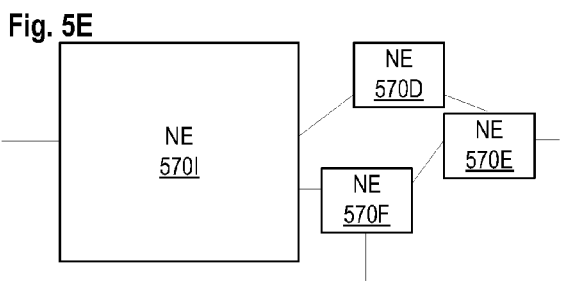
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
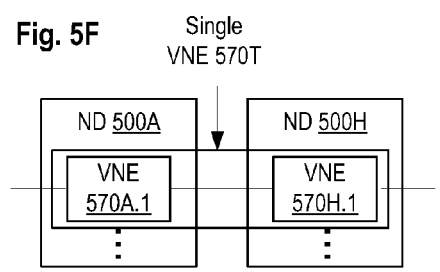
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
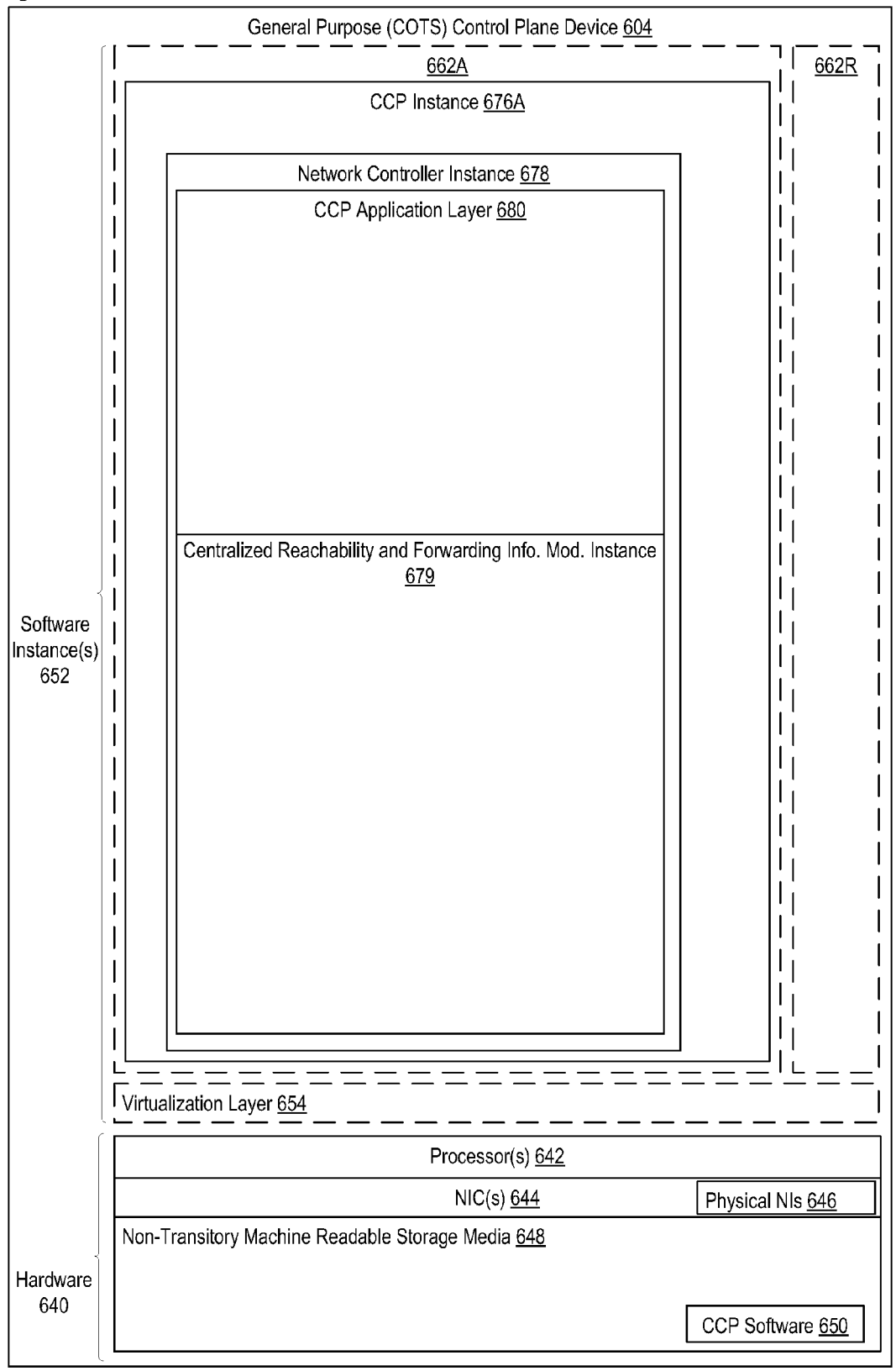
FIG. 6 illustrates a general purpose control plane device with centralized control plane (CCP) software), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a network device for performing service chaining, the method comprising:
   generating a plurality of service chaining (SC) next hops (NHs) by, for each SC NH hop:
      generating a plurality of SC maps, each SC map identifying a chain of one or more service modules, wherein each service module is to apply a corresponding service on a packet, and
      generating a plurality of hosted NHs, each hosted NH including forwarding information that causes the packet to be forwarded to a corresponding service module;
   in response to receiving the packet, identifying a SC NH of the plurality of SC NHs based on an Internet Protocol (IP) address of the packet, comprising:
      in response to determining the packet is an upstream packet transmitted by a subscriber end station, using a source IP address of the packet to identify the SC NH: or
      in response to determining the packet is a downstream packet transmitted to a subscriber end station, using a destination IP address of the packet to identify die SC NH: and
   forwarding the packet to the corresponding service module based on the identified SC NH, comprising:
      in response to determining the packet is the upstream packet transmitted by the subscriber end station, identifying an upstream SC map of the SC NH; determining an interface from which the packet is received; identifying a hosted NH of the plurality of hosted NHs of the SC NH based on the determined interface and the upstream SC map; and using the forwarding information included in the hosted NH to forward the packet to the corresponding service module, causing the corresponding service module to apply the corresponding service on the jacket; or
      in response to determining the packet is the downstream packet transmitted to the subscriber end station, identifying a downstream SC map of the SC NH; determining an interface from which the packet is received; identifying a hosted NH of the plurality of hosted NHs of the SC NH based on the determined interface and the downstream SC map; and Using the forwarding information included in the hosted NH to forward the packet to the corresponding service module, causing the corresponding service module to apply the corresponding service on the packet.

2. The method of claim 1, further comprising:
   determining a subscriber application to which the packet belongs; and
   identifying the upstream SC map based on the determined subscriber application.

3. The method of claim 1, further comprising:
identifying a subscriber profile associated with the packet;
identifying a service module based on the subscriber profile; and
forwarding the packet to the service module, causing the service module to apply a service on the packet.

4. A network device for performing service chaining, the network device comprising:
a set of one or more processors; and
a non-transitory machine-readable storage medium containing code, which when executed by the set of one or more processors, causes the network device to:
generate a plurality of service chaining (SC) next hops (NHs) by, for each SC NH hop:
generating a plurality of SC maps, each SC map identifying a chain of one or more service modules, wherein each service module is to apply a corresponding service on a packet, and
generating a plurality of hosted NHs, each hosted NH including forwarding information that causes the packet to be forwarded to a corresponding service module;
in response to receiving the packet, identify a SC NH of the plurality of SC NHs based on an Internet Protocol (IP) address of the packet, wherein the identification includes to:
in response to a determination that the packet is an upstream packet transmitted by a subscriber end station, use a source IP address of the packet to identify the SC NH: or
in response to a determination that the packet is a downstream packet transmitted to a subscriber end station, use a destination IP address of the packet to identify the SC NH: and
forward the packet to the corresponding service module based on the identified SC NH, comprising:
in response to determining the packet is the upstream packet transmitted by the subscriber end station, identify an upstream SC map of the SC NH; determine an interface from which the packet is received; identify a hosted NH of the plurality of hosted NHs of the SC NH based on the determined interface and the upstream SC map; and use the forwarding information included in the hosted NH to forward the packet corresponding to the service module, causing the corresponding service module to apply the corresponding service on the packet; or
in response to determining the packet is the downstream packet transmitted to the subscriber end station, identify a downstream SC map of the SC NH; determine an interface from which the packet is received; identify a hosted NH of the plurality of hosted NHs of the SC NH based on the determined interface and the downstream SC map; and use the forwarding information included in the hosted NH to forward the packet to the corresponding service module, causing the corresponding service module to apply the corresponding service on the packet.

5. The network device of claim 4, wherein the non-transitory machine-readable storage medium further contains code, which when executed by the set of one or more processors, causes the network devices to: —
determine a subscriber application to which the packet belongs; and
identify the upstream SC map based on the determined subscriber application.

6. The network device of claim 4, wherein the non-transitory machine-readable storage medium further contains code, which when executed by the set of one or more processors, causes the network device to:
identify a subscriber profile associated with the packet;
identifying a service module based on the subscriber profile; and
forward the packet to the service module, causing the service module to apply a service on the packet.

7. A non-transitory machine-readable storage medium having computer code store therein, which when executed by a set of one or more processors of a network device for performing service chaining, causes the network device to perform operations comprising:
generating a plurality of service chaining (SC) next hops (NHs) by, for each SC NH hop:
generating a plurality of SC maps, each SC map identifying a chain of one or more service modules, wherein each service module is to apply a corresponding service on a packet, and
generating a plurality of hosted NHs, each hosted NH including forwarding information that causes the packet to be forwarded to a corresponding service module;
in response to receiving the packet, identifying a SC NH of the plurality of SC NHs based on an Internet Protocol (IP) address of the packet, comprising:
in response to determining the packet is an upstream packet transmitted by a subscriber end station, using a source IP address of the packet to identify the SC NH: or
in response to determining the packet is a downstream packet transmitted to a subscriber end station, using a destination IP address of the packet to identify die SC NH: and
forwarding the packet to the corresponding service module based on the identified SC NH, comprising:
in response to determining the packet is the upstream packet transmitted by the subscriber end station, identifying an upstream SC map of the SC NH; determining an interface from which the packet is received; identifying a hosted NH of the plurality of hosted NHs of the SC NH based on the determined interface and the upstream SC map; and using the forwarding information included in the hosted NH to forward the packet to the corresponding service module, causing the corresponding service module to apply the corresponding service on the packet; or
in response to determining the packet is the downstream packet transmitted to the subscriber end station, identifying a downstream SC map of the SC NH; determining an interface from which the packet is received; identifying a hosted NH of the plurality of hosted NHs of the SC NH based on the determined interface and the downstream SC map; and using the forwarding information included in the hosted NH to forward the packet to the corresponding service module, causing the corresponding service module to apply the corresponding service on the packet.

8. The non-transitory machine readable medium of claim 7, further comprising:
determining a subscriber application to which the packet belongs; and
identifying; the upstream SC map based on the determined subscriber application.

9. The non-transitory machine-readable storage medium of claim 7, further comprising:

identifying a subscriber profile associated with the packet;
identifying a service module based on the subscriber profile; and
forwarding the packet to the service module, causing the service module to apply a service on the packet.

10. A method in a virtual machine for performing service chaining, the method comprising:
generating a plurality of service chaining (SC) next hops (NHs) by, for each SC NH hop:
generating a plurality of SC maps, each SC map identifying a chain of one or more service modules, wherein each service module is to apply a corresponding service on a packet, and
generating a plurality of hosted NHs, each hosted NH including forwarding information that causes the packet to be forwarded to a corresponding service module;
in response to receiving the packet, identifying a SC NH of the plurality of SC NHs based on an Internet Protocol (IP) address of the packet, comprising:
in response to determining the packet is an upstream packet transmitted by a subscriber end station, using a source IP address of the packet to identify the SC NH: or
in response to determining the packet is a downstream packet transmitted to a subscriber end station, using a destination IP address of the packet to identify die SC NH: and
forwarding the packet to the corresponding service module based on the identified SC NH, comprising:
in response to determining the packet is the upstream packet transmitted by the subscriber end station, identifying an upstream SC map of the SC NH; determining an interface from which the packet is received; identifying a hosted NH of the plurality of hosted NHs of the SC NH based on the determined interface and the upstream SC map; and using the forwarding information included in the hosted NH to forward the packet to the corresponding service module, causing the corresponding service module to apply the corresponding service on the packet, or
in response to determining the packet is the downstream packet transmitted to the subscriber end station, identifying a downstream SC map of the SC NH; determining an interface from which the packet is received; identifying a hosted NH of the plurality of hosted NHs of the SC NH based on the determined interface and the downstream SC map; and using the forwarding information included in the hosted NH to forward the packet to the corresponding service module, causing the corresponding service module to apply the corresponding service on the packet.

11. The method of claim 10, further comprising:
determining a subscriber application to which the packet belongs; and
identifying; the upstream SC map based on the determined subscriber application.

12. The method of claim 10, further comprising:
identifying a subscriber profile associated with the packet;
identifying a service module based on the subscriber profile; and
forwarding the packet to the service module, causing the service module to apply a service on the packet.

* * * * *